(12) United States Patent
Murphy et al.

(10) Patent No.: US 11,370,153 B2
(45) Date of Patent: Jun. 28, 2022

(54) METHOD FOR FORMING A FIBER-REINFORCED CABLE TIE

(71) Applicant: ABB Schweiz AG, Baden (CH)

(72) Inventors: Kathryn F. Murphy, Raleigh, NC (US); Dariusz Bednarowski, Cracow (PL); Yan Gao, Bothell, WA (US); Claude J. Bauer, Greenbrier, TN (US); Joseph P. Mattingly, Memphis, TN (US); Nikolauz Zant, Raleigh, NC (US); Marco Schneider, Wurenlingen (CH)

(73) Assignee: ABB SCHWEIZ AG, Baden (CH)

( * ) Notice: Subject to any disclaimer, the term of this patent is extended or adjusted under 35 U.S.C. 154(b) by 328 days.

(21) Appl. No.: 16/214,956

(22) Filed: Dec. 10, 2018

(65) Prior Publication Data

US 2019/0111596 A1    Apr. 18, 2019

Related U.S. Application Data (63) Continuation of application No. PCT/US2017/036099, filed on Jun. 6, 2017.

(60) Provisional application No. 62/347,829, filed on Jun. 9, 2016.

(51) Int. Cl.
  *B29C 45/14*     (2006.01)
  *B29L 31/00*     (2006.01)
  *B29K 101/12*    (2006.01)

(52) U.S. Cl.
  CPC .. *B29C 45/14065* (2013.01); *B29C 45/14073* (2013.01); *B29C 45/14549* (2013.01); *B29C 45/14786* (2013.01); *B29C 45/14819* (2013.01); *B29C 2045/14081* (2013.01);
  (Continued)

(58) Field of Classification Search
  None
  See application file for complete search history.

(56) References Cited

U.S. PATENT DOCUMENTS

| | | | |
|---|---|---|---|
| 2,418,823 A * | 4/1947 | Desimone | B29C 45/14073 249/94 |
| 5,513,421 A | 5/1996 | Wells | |
| 7,017,237 B2 | 3/2006 | Magno, Jr. et al. | |

(Continued)

FOREIGN PATENT DOCUMENTS

| | | |
|---|---|---|
| CN | 201317516 | 9/2009 |
| DE | 29102227 | 9/1980 |

OTHER PUBLICATIONS

Search Report and Written Opinion, PCT Appln. No. PCT/US2017/036099, 8 pgs. dated Aug. 10, 2017.

*Primary Examiner* — Edmund H Lee
(74) *Attorney, Agent, or Firm* — Greenberg Traurig, LLP (57) ABSTRACT

A method for forming a fiber-reinforced cable tie includes placing at least one reinforcing fiber in a mold cavity, injecting a molten material in the mold cavity, wherein the molten material defines a melt front during injection, and maintaining a position of the reinforcing fiber within the mold cavity at the melt front during the injecting of the melt, whereby the fiber is substantially encapsulated by the molten material. A mold for forming a fiber-reinforced cable tie includes a mold cavity and a fiber guide movably supported within the mold cavity for maintaining a position of a reinforcing fiber placed within the mold cavity during injection of a molten material into the mold cavity.

13 Claims, 8 Drawing Sheets

(52) U.S. Cl.
CPC .............. *B29C 2045/14557* (2013.01); *B29K 2101/12* (2013.01); *B29L 2031/7276* (2013.01)

(56) References Cited

U.S. PATENT DOCUMENTS

| | | | |
|---|---|---|---|
| 2004/0098841 A1* | 5/2004 | Crosby | B65D 63/10 24/16 R |
| 2015/0064437 A1* | 3/2015 | Luo | B29C 45/0005 428/220 |

* cited by examiner

METHOD FOR FORMING A FIBER-REINFORCED CABLE TIE

CROSS-REFERENCE TO RELATED APPLICATIONS

This application claims priority from U.S. provisional application Ser. No. 62/347,829, filed on Jun. 9, 2016, the specification of which is incorporated herein in its entirety for all purposes.

TECHNICAL FIELD

The present invention relates to the manufacture of cable ties having improved mechanical strength. More particularly, the present invention is directed to a method for injection molding of fiber-reinforced cable ties employing a fiber guide within the injection mold.

BACKGROUND

A cable tie or tie-wrap, also known as a hose tie, zap-strap or zip tie, is a type of fastener for holding items together, such as electric cables or wires. Because of their low cost and ease of use, tie-wraps are ubiquitous, finding use in a wide range of other applications.

The common tie-wrap has a tape section with teeth that engages with a pawl in the head to form a ratchet so that, as the free end of the tape section is pulled, the tie-wrap tightens and does not come undone. Another version of the tie-wrap allows a tab to be depressed to either adjust the tension or remove the tie-wrap. Another popular design of the cable tie locking mechanism involves a metallic barb in the head slot. The metallic, e.g. stainless steel, barb is inserted after the plastic part is molded. The barb engages and cuts into the strap surface to lock the strap in place when fastened.

Cable ties are typically made out of a wide variety of polymeric, composite, and metallic materials in order to achieve various degrees of strength, creep resistance, and functionality. It is often desirable to improve upon the strength of the cable tie by introducing a reinforcing material to the base material of the cable tie. However, there are no efficient methods yet to make a cable tie stronger using reinforcing fibers, (e.g. glass), which would drastically increase creep resistance, strength, and lifetime without introducing metallic components.

For example, it is known in the art to use extrusion techniques to make glass-reinforced cable ties. However, this method requires the multiple step process of separately forming a glass-reinforced band and a locking mechanism. The band must then be attached to the locking mechanism in a subsequent step.

Lamination techniques are also sometimes used to make glass-reinforced cable ties. However, this method requires careful and precise sandwiching of glass fiber bundles between plastic sheets, followed by a subsequent gluing of the layers together.

Thus, injection molding would appear to be the preferred method of making reinforced cable ties, since the alternatives mentioned above (e.g. those based on co-extrusion of fibers with plastic) require multiple steps to form a single-piece cable tie. With injection molding, the fiber reinforced cable tie can be created in a single step.

However, in molding other products, injection molding over flexible inserts is rarely done since maintaining the positions of such structures during high-speed, high-pressure injection of plastic melt is extremely difficult, if not impossible. Efforts to overcome the difficulty of maintaining the position of flexible inserts include the use of retractable pins or blades, which hold the insert in place during injection and retract before the melt solidifies or just before the melt front reaches the pin. Needless to say, these efforts require the design of rather complex molds.

In the case of injection molding fiber-reinforced cable ties, this same problem exists. Specifically, the problem of the fibers being deflected to the sidewalls of the cavity must be overcome. This problem can be seen in the prior art drawings of FIGS. 1a and 1b, which will be discussed in further detail below.

Accordingly, it would be desirable to provide a simple method for molding a fiber-reinforced cable to enable a single-step manufacture by injection molding of plastic over the fibers. More particularly, it would be desirable to provide a method for injection molding a fiber-reinforced cable tie that solves the problem of deflection of the fiber within the injection mold.

SUMMARY

The present invention solves the problem of fiber displacement during injection molding by providing a means of positioning and fixing the fibers at the melt front. Once inside the melt, the fibers are not drastically displaced. The means for positioning and holding the fibers in place includes one or more movable parts which hold the fibers inside the injection mold cavity until just before the melt reaches them. The fibers are thus held in place at the melt front for the entire injection cycle, ensuring that the fibers are not deflected from the desired placement.

In one aspect of the present invention, a method for forming a fiber-reinforced cable tie is provided including placing at least one reinforcing fiber in a mold cavity, injecting a molten material in the mold cavity, wherein the molten material defines a melt front during injection, and maintaining a position of the reinforcing fiber within the mold cavity at the melt front during the injecting of the melt, whereby the fiber is substantially encapsulated by the molten material. The reinforcing fiber is maintained in position by a fiber guide, which is movably supported within the mold cavity.

In one embodiment, the fiber guide slides along a length of the reinforcing fiber while being pushed by the melt front in the mold cavity to maintain the position of the fiber within the mold cavity. In another embodiment, the fiber guide alternately grips and releases the reinforcing fiber at the melt front during the injecting of the molten material in the mold cavity.

In another aspect of the invention, a mold for forming a fiber-reinforced cable tie is provided. The mold includes a mold cavity and a fiber guide movably supported within the mold cavity for maintaining a position of a reinforcing fiber placed within the mold cavity during injection of a molten material into the mold cavity.

In a first embodiment of this aspect of the invention, the fiber guide is a slide member having a central aperture for receiving a reinforcing fiber and having a cross-sectional shape substantially matching a cross-sectional shape of the mold cavity. The slide member further preferably includes a slot for facilitating insertion of a reinforcing fiber into the aperture.

In a second embodiment of this aspect of the invention, the fiber guide includes a plurality of pairs of opposed sliders movably supported in the mold cavity for alternately gripping and releasing a reinforcing fiber placed in the mold cavity. In one alternative in this embodiment, an actuating mechanism is provided for individually driving each pair of slides. In another alternative in this embodiment, each pair of opposed sliders comprises a pair of inclined actuating surfaces facing each other so that the movement of the plastic melt front itself will actuate the opposed sliders in a direction perpendicular to the direction of travel of the melt. In this second alternative, a biasing device is preferably provided for biasing the slides in each pair toward one another.

The present invention provides substantial business benefits. For example, the present invention enables manufacture of fiber reinforced cable ties by injection molding, wherein the fibers of the cable tie are reliably encapsulated in plastic. Reduced cost is also achieved with the present invention in that relatively inexpensive fiber strands are utilized rather than expensive pre-impregnated fabrics or tapes. Cost is also reduced by minimizing manufacturing steps.

The present invention also results in better part consistency in that the reinforcing glass fibers are in the same position in each part. More design freedom is also afforded by the present invention in that the invention enables injection molding over inserts, which previously could not be over-molded. This can potentially save manufacturing steps and allows for more complex structures.

Features of the disclosure will become apparent from the following detailed description considered in conjunction with the accompanying drawings. It is to be understood, however, that the drawings are designed as an illustration only and not as a definition of the limits of this disclosure.

BRIEF DESCRIPTION OF THE DRAWINGS

FIG. 3b is a bottom view of the fiber guide shown in FIG. 3a.

DETAILED DESCRIPTION OF PREFERRED EMBODIMENTS

Figure 1A:
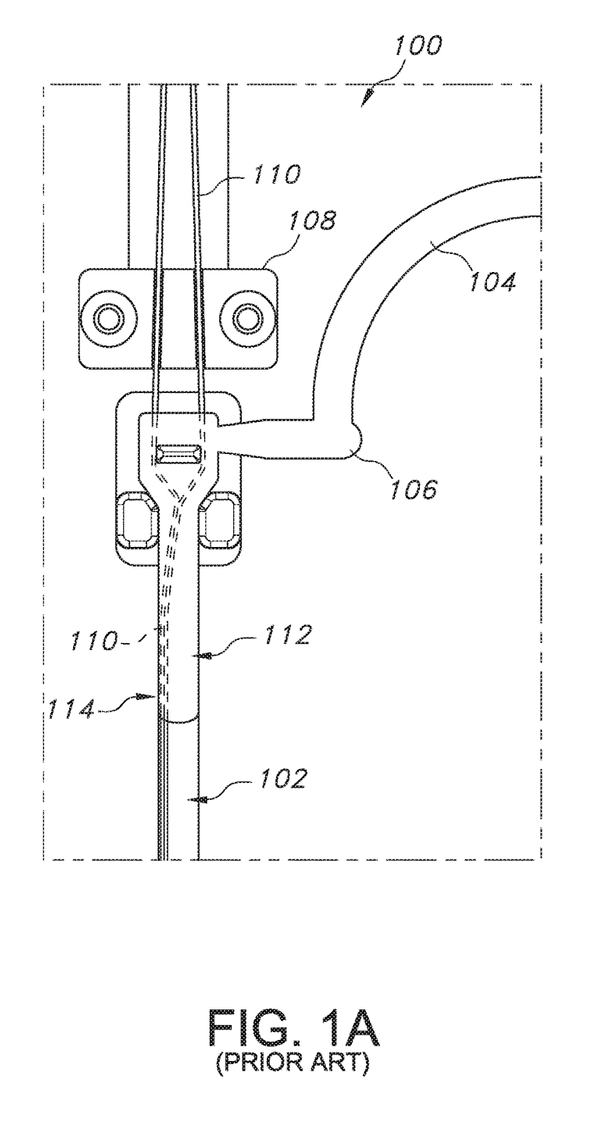
FIG. 1a shows the prior art problem of injection molding a fiber reinforced cable tie.
Figure 1B:
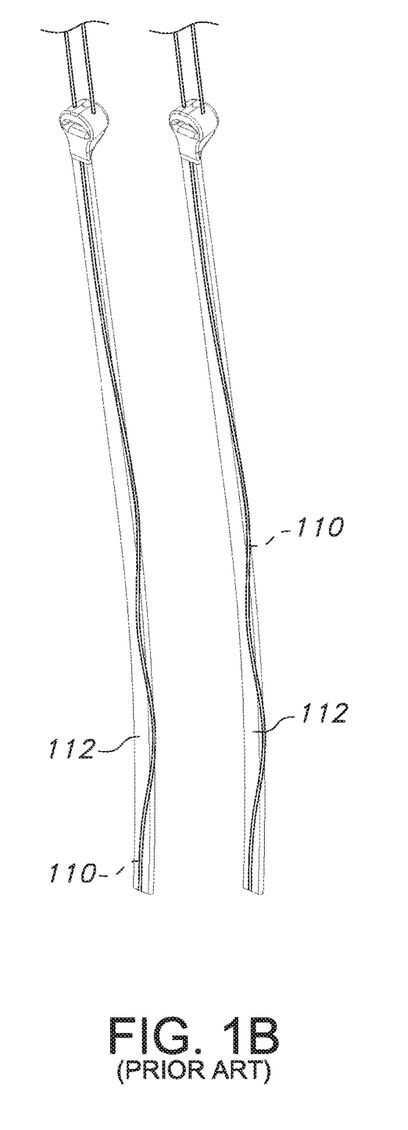
FIG. 1b shows cable ties molded by prior art methods, wherein the fibers have been pushed outside the plastic of the cable tie.

FIG. 1a shows a prior art injection mold 100 for forming a fiber-reinforced cable tie including a mold cavity 102, a runner 104 for introducing a plastic melt 106 into the mold cavity and a fiber retaining device 108 for feeding glass fibers 110 into the mold cavity. The goal is to mold the plastic 106 around the glass fibers 110 to produce a reinforced cable tie 112. However, as can be appreciated, the reinforcing glass fibers 110 are inevitably pushed to the sides 114 of the cavity 103 under the pressure of the injected plastic melt 106. The result is a glass fiber 110 that is not encapsulated by plastic. FIG. 1b shows the resulting cable tie 112 where the fibers 110 have been pushed to the side and not surrounded by plastic.

Figure 2:
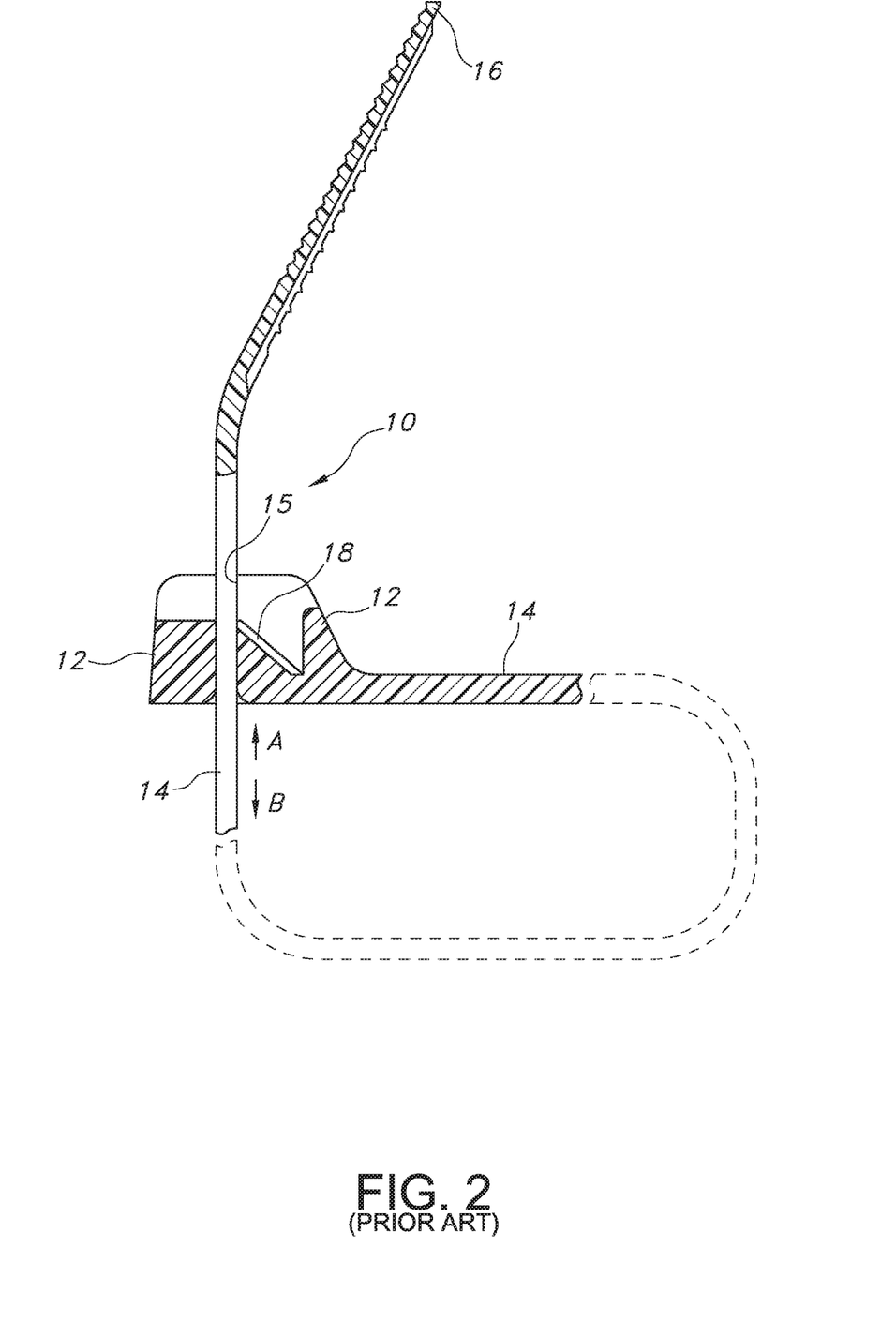
FIG. 2 shows, in section, an exemplary cable tie of the prior art, having a head containing an aperture and locking mechanism and an extending strap, with the strap inserted into the head.

Referring now to FIG. 2, a cable tie 10 of the prior art is shown for reference. The cable tie 10 of the prior art is typically an elongate molded plastic member, which is used in a manner described above to wrap around a bundle of articles (not shown). The cable tie 10 is typically made from a plastic composition and includes a head 12 at one end thereof, a tail 16 at the other end of the head and a generally planar strap 14 therebetween. In the illustrative embodiment provided, the head 12 is formed as an integral portion of the cable tie 10. However, in certain applications the cable tie 10 may be constructed in a manner where the head 12 is formed separately from the strap 16.

The head 12 of the cable tie 10 includes an aperture 15 therethrough (shown with the strap 14 therein) for insertably accommodating the tail 16 and passage of the strap 14 therein in a first direction "A". The head 12 of cable tie 10 typically includes a locking device 18 supported by the head 12 and extending into the aperture. The locking device 18 permits insertion of the strap 14 in the first direction "A" and prevents substantial movement of the strap 14 in a second direction "B" opposite the first direction upon an attempt to withdraw the strap 14 from the aperture. The locking device may include a metallic barb such as shown in U.S. Pat. No. 5,513,421, or an integrally formed plastic pawl such as shown in U.S. Pat. No. 7,017,237.

As mentioned above, it would be desirable to strengthen the plastic by introducing reinforcing fibers to the plastic composition prior to molding the cable tie. However, as also mentioned above, fiber strands placed in an injection mold become displaced during injection molding because they are very compliant in bending. No amount of tension can keep the fibers from deflecting under small amounts of force. As the melt front advances, it pushes the fibers aside, as shown in FIGS. 1a and 1b.

The method according to the present invention solves this problem by providing a means for holding the fibers in place at or near the melt front. With this method, the fibers will be correctly positioned in the cable tie.

Figure 3A:
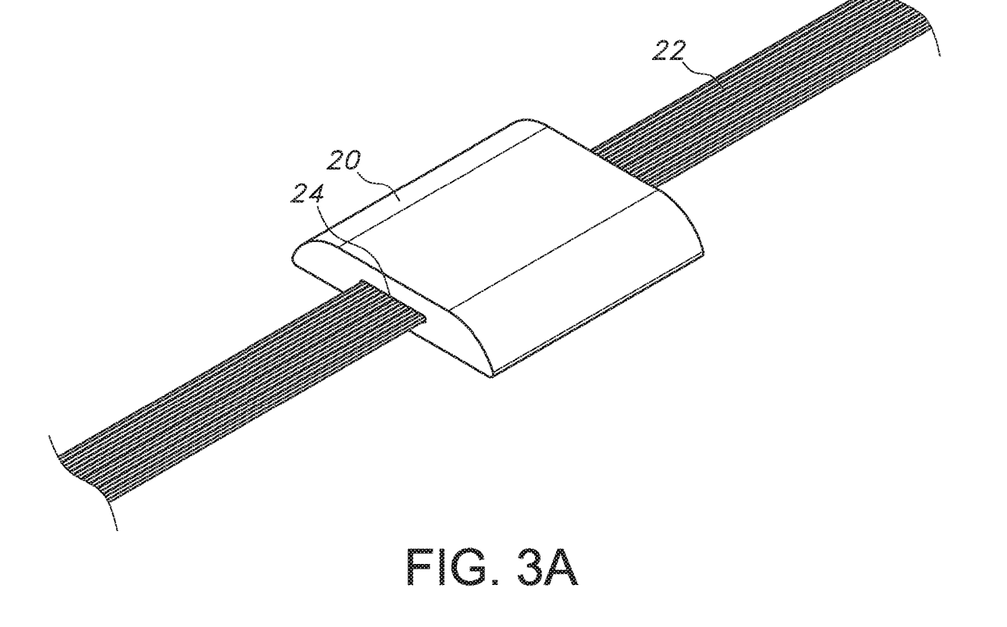
FIG. 3a is a top perspective view of a fiber guide according to one embodiment of the present invention holding a bundle of fibers within an injection mold (not shown).
Figure 3B:
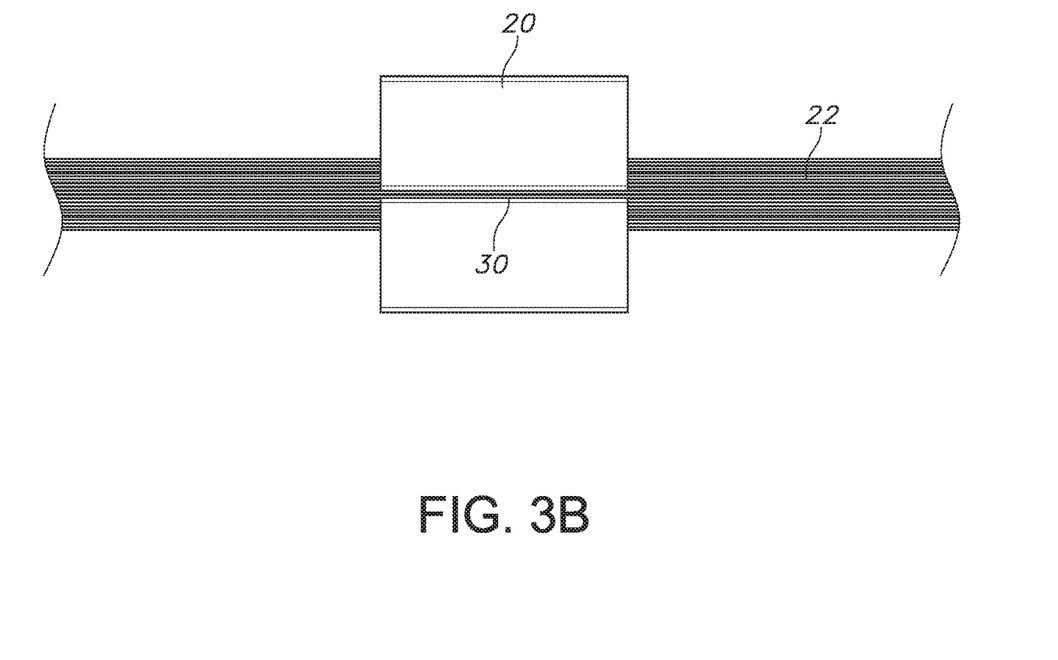

Turning now to FIGS. 3a and 3b, in one embodiment, the present invention provides a fiber guide 20 for holding one or more fibers 22 within a mold cavity of an injection mold (not shown in FIGS. 3a and 3b) during injection of a plastic melt. As will be discussed in further detail below, this embodiment involves the use of a single movable part 20 which holds the fibers 22 in place at the melt front and slides along the strap length inside the mold cavity, propelled by the melt.

The fiber guide 20 has a cross-sectional shape substantially matching the cross-sectional shape of the strap portion of the cable tie to be molded in the mold. The fiber guide 20 can be formed from any material that will not react with the plastic melt used to form the cable tie. The material of the fiber guide 20 must also be able to withstand the temperature of the injection molding process. The fiber guide 20 could also be made of a material which is not harder than the injection mold, to avoid damage to the mold. It is also conceivable to fabricate the fiber guide 20 out of the same material as the cable tie itself and allow it to weld to the finished part The fiber guide 20 has a central aperture 24 extending along the length of the guide in a direction perpendicular to its cross-section. The aperture 24 is sized to surround one or more strands of reinforcing fibers 22 while inside a mold cavity 26 of a cable tie injection mold 28. The central aperture 24 for the fibers 22 preferably has a cross sectional area that is 1.5-2.5 times the cross sectional area of the fiber bundles 22. With the central aperture 24 being slightly larger than the cross sectional area of the fiber bundles 22, the guide 20 can freely slide along the length of the fibers, as will be discussed in further detail below.

A slot 30 is also formed through one of the surfaces of the fiber guide 20 to facilitate insertion of the fibers 22 into the central aperture 24. The slot 30 could be formed parallel to or at an angle to the central longitudinal axis of the central aperture 24 and fibers 22. Also, the slot 30 could be straight or curved, and could be placed on any side of the fiber guide 20.

Figure 4A:
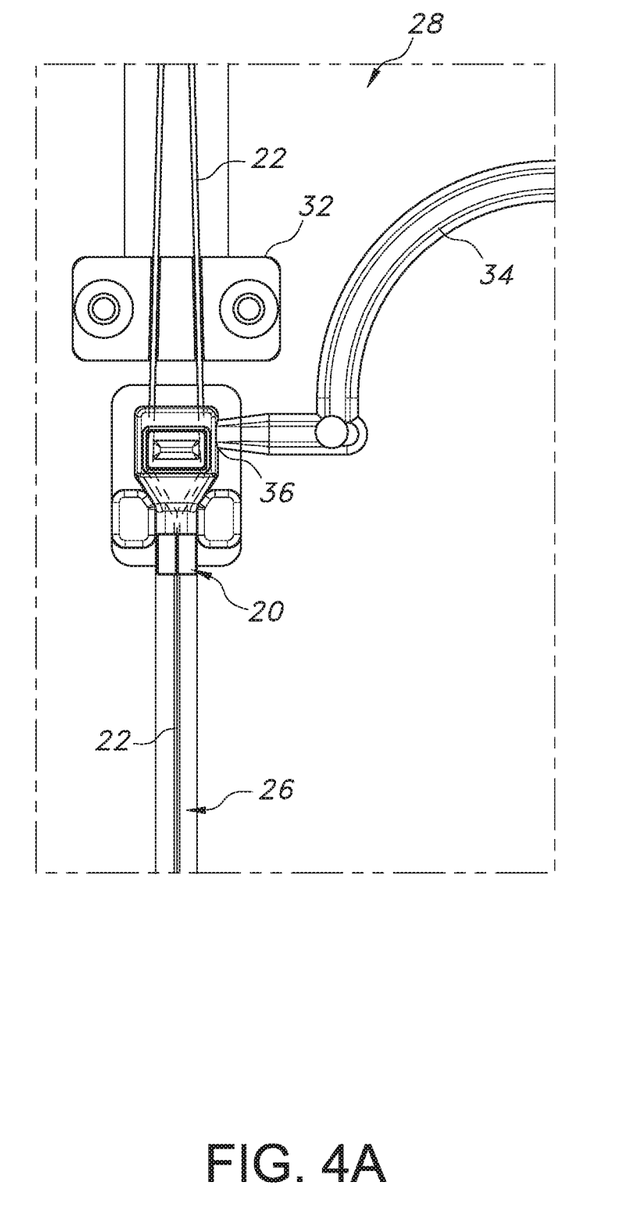
FIG. 4a is a section view of an injection mold with the fiber guide according to FIGS. 3a and 3b supported within the mold cavity prior to injection of the plastic melt.
Figure 4B:
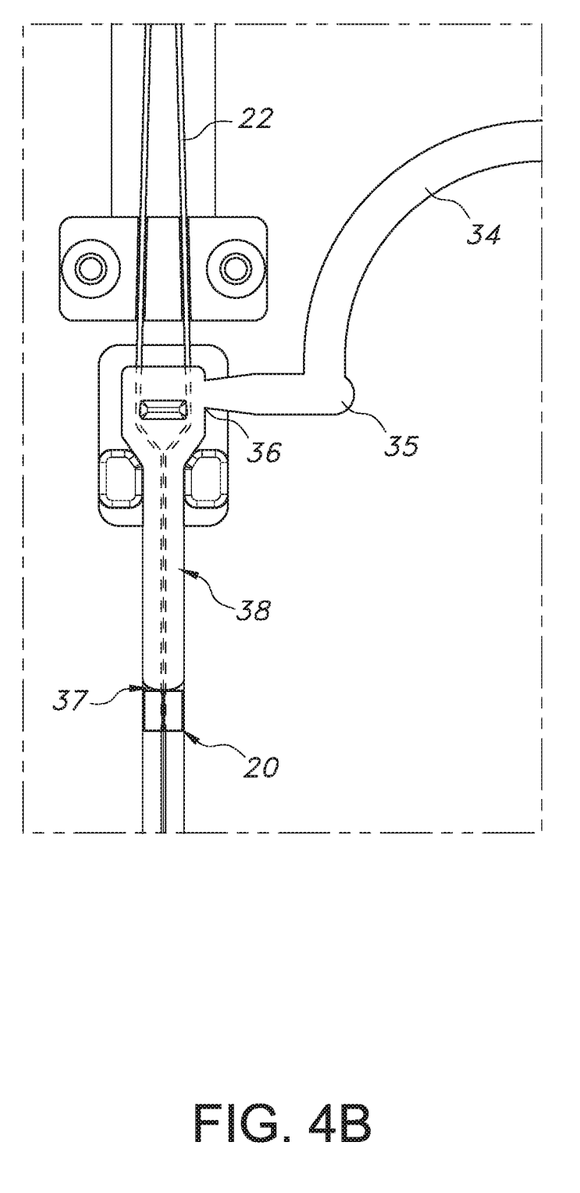
FIG. 4b is a section view of the injection mold shown in FIG. 4a after injection of the plastic melt.

Referring additionally to FIGS. 4a and 4b, the fiber guide 20 has essentially the same cross-sectional shape as the cross-sectional shape of the mold cavity 26 for the cable tie strap. In a preferred embodiment, the cross-sectional shape of the fiber guide 20 is about 2% smaller than the cross-sectional shape of the mold cavity 26 so that it is free to slidably move along the length of the mold cavity when the mold 28 is closed.

During the injection molding process, the fiber strands 22 are clamped outside of the cavity 26 by a mold clamping device 32 to keep them taut. The mold 28 further includes a runner 34 providing a path for injection of the plastic melt 35. The runner 34 interfaces with the mold cavity 26 at a gate 36 so as to provide fluid communication between a source of molten plastic and the mold cavity 26 in a conventional manner.

At the beginning of the molding cycle, the fiber guide 20 is initially positioned at the end of the mold cavity 26 nearest the gate 36, as shown in FIG. 4a. Since the fiber guide 20 has relatively low mass with respect to the mold, it can be initially held in place within the mold cavity 26 by friction alone. When the plastic melt 35 is injected past the gate 36 into the mold cavity 26, the melt front 37, (i.e., the leading edge of the plastic material as it flows into the mold cavity from the gate), pushes the fiber guide 20 down the length of the cavity 26, as shown in FIG. 4b. As a result, the fiber guide 20 also slides along the length of the fibers 22 slidably held within its central aperture 24. This maintains the central position of the fibers 22 near the melt front, resulting in fibers that are correctly positioned within the center of the part.

At the end of the molding cycle, the fiber guide 20 is positioned at the far end of the mold cavity 26 opposite the gate 36, as shown in FIG. 4b. The final position of the fiber guide 20 can be set by a mechanical stop provided in the mold cavity 26 that prevents further movement of the fiber guide. Alternatively, the amount of plastic melt injected into the mold cavity can determine the end position of the fiber guide 20. In any event, once the plastic material has hardened, the mold is opened and the cable tie is removed from the cavity, wherein the fibers 22 are cut from the head and tail portion of the cable tie.

Once the molded cable tie is removed from the mold, the fiber guide 20, which can remain in the mold cavity, is returned to its initial position adjacent to the gate, and a new length of fiber can be threaded into the aperture of the fiber guide and pulled taut along the length of the mold cavity, as described above, to begin a new molding cycle. It can be appreciated that such process can be done manually or by automation mechanisms.

In a preferred embodiment, the fiber guide 20 is coated with a low-friction material (e.g. Teflon) to facilitate sliding and reduce sticking due to flash inside the aperture 24 of the slider. The fiber guide 20 could also be designed so that it stays in the mold after injection and ejection (by a non-stick coating or by using a holder), thereby removing a manufacturing step. It is still further conceivable to make the fiber guide open and close rather than having an insertion slot in order to better keep the fibers inside the part (two-piece fiber guide).

Figure 5:
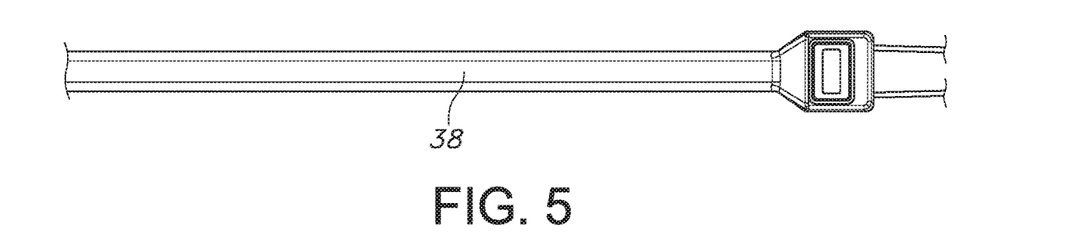
FIG. 5 shows a cable tie formed in the injection mold shown in FIGS. 4a and 4b.

A cable tie 38 formed according to the method of the present invention is shown in FIG. 5. As can be seen in FIG. 5, the reinforcing fiber strand is centrally encapsulated within the cable tie.

This first embodiment of the present invention is beneficial in that it does not require any additional components or equipment for the mold. In addition, the mold itself will not require mechanical modification.

Figure 6:
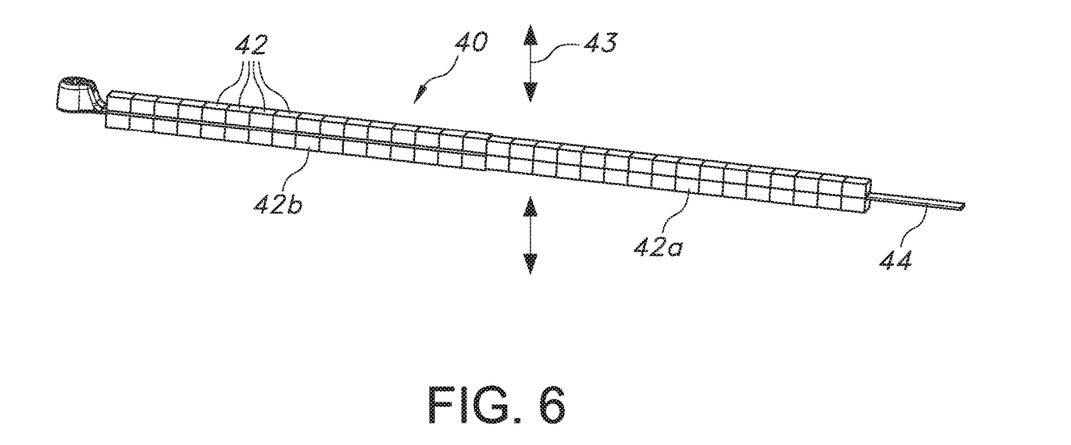
FIG. 6 is a top perspective view of a fiber guide according to another embodiment of the present invention holding a bundle of fibers within an injection mold (not shown).

Turning now to FIG. 6, in an alternative embodiment, a fiber guide 40 in the form of a plurality of pairs of opposed sliders 42 is provided for holding one or more fibers 44 in an injection mold (not shown in FIG. 6) during injection of a plastic melt. In this embodiment, a series of movable sliders 42 are actuated in the direction perpendicular to the strap length in order to sequentially open and close the space between a respective pair of actuators as the mold cavity fills with the polymer. An actuating mechanism is provided in the mold cavity for individually driving each pair of sliders 42 in the direction of the arrow 43 shown in FIG. 6. FIG. 6 shows "closed sliders" 42a, on the right side, before the melt hits their position, and "open sliders" 42b, on the left side after the melt hits their position.

Figure 7:
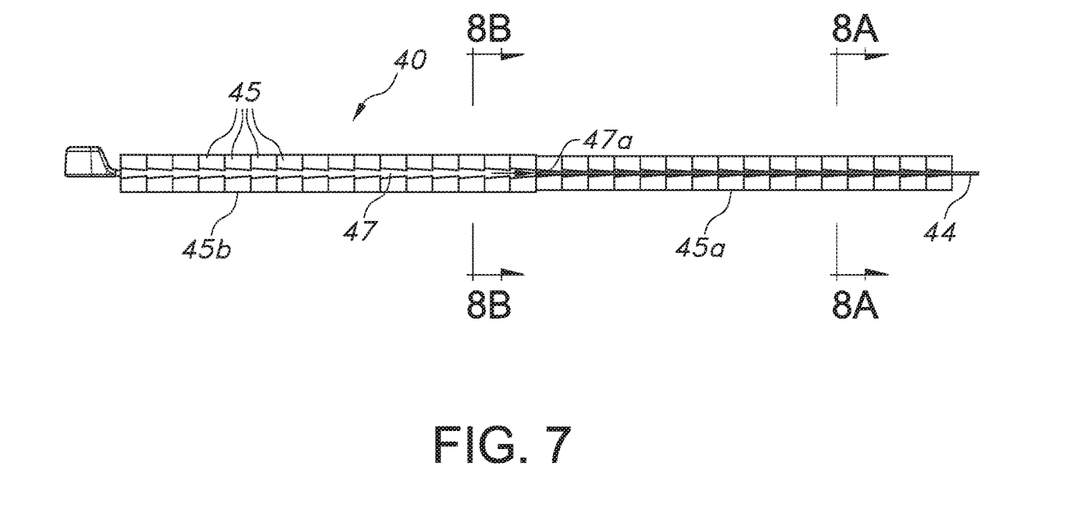
FIG. 7 is a cross-sectional view of a fiber guide according to still another embodiment of the present invention holding a bundle of fibers within an injection mold (not shown).

FIG. 7 shows an alternative embodiment to FIG. 6, wherein the sliders 45 are instead actuated by the force of the injected plastic itself, as opposed to being externally actuated. Here, a plurality of pairs of opposed sliders 45 is again provided for holding one or more fibers 44 in an injection mold (not shown in FIG. 7) during injection of a plastic melt 47. The series of movable sliders 45 are actuated in the direction perpendicular to the strap length in order to sequentially open and close the space between a respective pair of sliders as the mold cavity fills with the polymer 47.

Figure 8A:
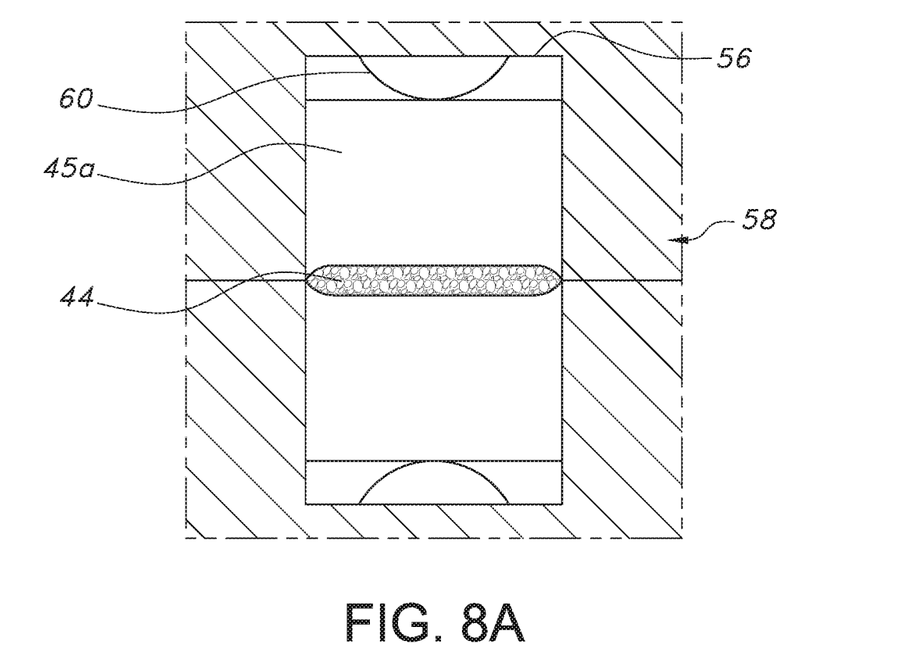
FIG. 8a is a cross-sectional view of the fiber guide shown in FIG. 7 taken along the line 8a-8a with the injection mold also shown.
Figure 8B:
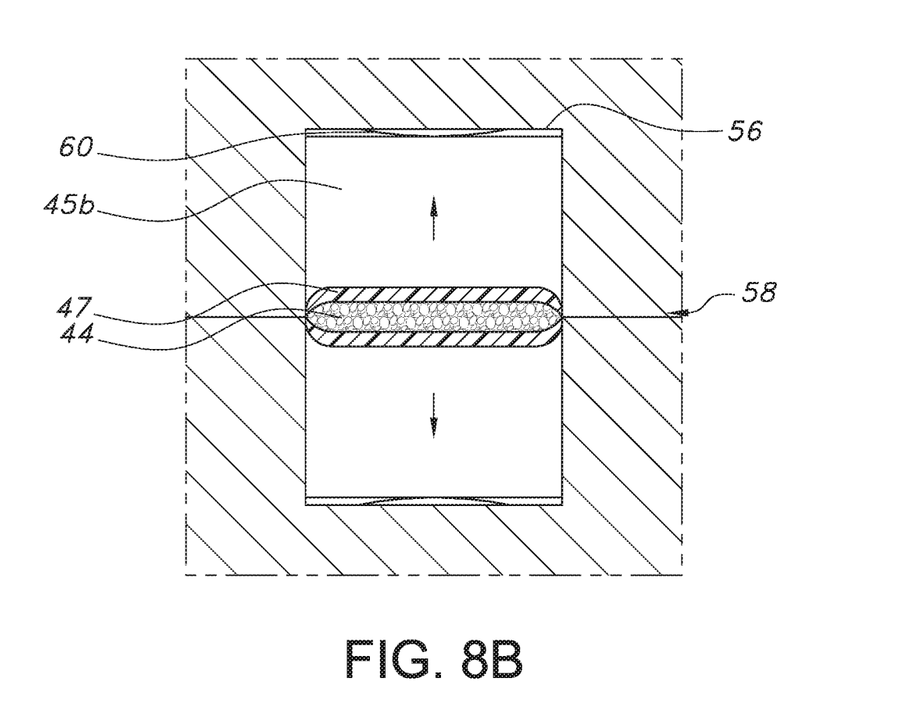
FIG. 8b is a cross-sectional view of the fiber guide shown in FIG. 7 taken along the line 8b-8b with the injection mold also shown.
Figure 9:
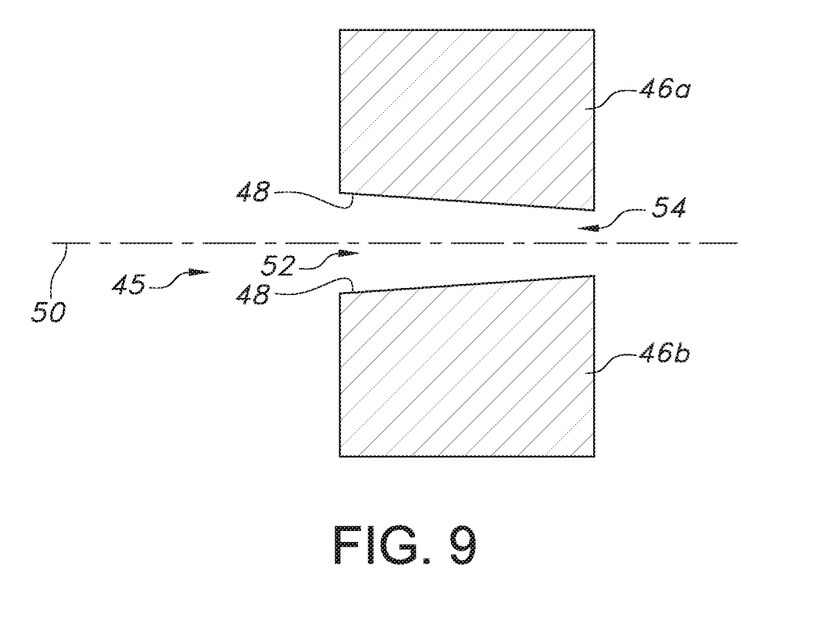
FIG. 9 is an isolated cross-sectional view of an individual pair of sliders of the fiber guide shown in FIGS. 7-8.

As shown further in FIGS. 8a, 8b and 9, each pair of sliders 45 includes a first slider member 46a and a second slider member 46b. However, unlike the embodiment shown in FIG. 6, each slider member 46a, 46b in this embodiment has an inclined actuating surface 48 formed at an acute angle with respect to a central axis 50 defining the direction of flow of the plastic melt 47. The first and second slider members 46a, 46b are oriented within a mold cavity 56 such that the inclined surfaces 48 face each other with the central axis 50 therebetween.

As shown specifically in FIG. 9, the first and second slider members 46a, 46b of each pair of sliders 45 form a flow channel for the plastic melt beginning at an upstream opening 52 at an upstream end of the slider pair and terminating at a downstream opening 54 at a downstream end of the slider pair, wherein the upstream opening 52 is larger than the downstream opening 54 by virtue of the orientation of the inclined surfaces 48. When assembled within a mold cavity, all of the upstream openings 52 of all of the pairs of sliders 45 face upstream in the direction of the inlet gate for the plastic melt.

Prior to injection of the plastic melt into the mold cavity 56 of the mold 58, the slider members 46a, 46b of each pair of sliders 45 are urged together into a closed position. This can be accomplished with some form of biasing device 60 (e.g. a leaf spring mechanism) provided in the mold cavity 56 acting on the ends of the slider members opposite the inclined surfaces 48. As shown in FIG. 8a, this would minimize the cross-section of the flow channels formed in each pair of sliders to hold the fibers 44 in place until just before the melt reaches the respective pair of sliders. When the melt front 47a reaches a pair of sliders 45 along the flow path of the mold cavity, the pressure of the melt will act on the actuating surfaces 48 of that pair of sliders urging the sliders apart. At that point, the sliders would open and allow the melt to flow past. In the meantime, each pair of downstream sliders remains in the closed position in order to hold the fiber until the melt reaches each respective position.

FIG. 7 shows "closed sliders" 45a on the right side, before the melt 47 hits their position, and "open sliders" 45b on the left side after the melt hits their position. This is further illustrated in FIG. 8a, which shows a pair of "closed sliders" 45a before the melt hits their position, and in FIG. 8b, which shows a pair of "open sliders" 45b after the melt 47 hits their position.

The added benefit of providing inclined actuating surfaces 48 in each pair of sliders 45 is that the resulting cable tie will be molded having a series of teeth or barbs created on its outer surface to facilitate gripping of the cable tie strap within the cable tie head. However, as an alternative to using inclined actuating surfaces, each pair of sliders can be driven between an open and closed position with mechanical actuators using timing mechanisms or using pressure sensors to trigger the sliders opening, as described above with reference to FIG. 6.

As can be appreciated, in this second embodiment, a specially designed mold would be required to allow for a series of movable sliders to be supported within the mold cavity 56. While this may increase the complexity and cost of the mold, such a mold could be used to produce cable ties with varying length. In other words, one complex mold could replace several molds that produce cable ties with the same head and cross-section but with different length. By controlling the number of sliders which are allowed to open, the length of the cable tie may be adjusted.

As used herein, the term "reinforcing fiber" is also used to refer to a reinforcing strand, or roving, or filament structure that is contiguous and unbroken along its length extending along a desired path. Unlike fiber reinforcing methods of the past, the continuous fiber is placed in the cable tie only where needed. Suitable materials for the continuous fiber include glass, aramid, carbon, metal, basalt, polybenzimidazole, natural fibers, etc.

For the polymer matrix, different thermoplastic materials could be used, (e.g., PA, POM, PBT, ETFE, PP, etc.). Thus, suitable base plastics include, but are not limited to, polyamide (e.g., nylon), polypropylene, polycarbonate, poly (ethylene tetrafluoroethylene), polyetheretherketone, poly (ethylene and chlorotrifluoroethylene), polyvinyl chloride, polyimide, polysulfone, and combinations of two or more thereof. Suitable base plastic materials may also include thermosets. In one embodiment, the base plastic is polypropylene. In one embodiment, the base plastic is polyamide. In one embodiment, the base plastic is polyamide 6 (i.e., nylon 6). In one embodiment, the base plastic is polyamide 6,6 (i.e., nylon 6,6). In one embodiment, base plastic is polyamide 6,6 loaded at between about 90-100 phr. In one embodiment, polyamide 6,6 is loaded at about 100 phr. In one embodiment, polyamide 6,6 loaded at about 100 phr is a medium impact modified compound with embedded process aid. In one embodiment, polyamide 6,6 loaded at about 100 phr is an unfilled resin with embedded process aid.

It is contemplated that both embodiments of the present invention could be used to make functional cable ties, (e.g. containing optical fibers or thermocouples). It is also contemplated that the concept of the present invention could extend to the molding of other parts besides cable ties, which would benefit from flexible over-molded inserts or reinforcing fibers It should be apparent to those skilled in the art that the described embodiments of the present invention provided herein are illustrative only and not limiting, having been presented by way of example only.

As described herein, all features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. While various embodiments of the present invention are specifically illustrated and/or described herein, it will be appreciated that modifications and variations of the present invention may be effected by those skilled in the art without departing from the spirit and intended scope of the invention.

All documents, patents and other literature referred to herein are incorporated by reference in their entirety.

The term "comprising" as may be used in the following claims is an open-ended transitional term that is intended to include additional elements not specifically recited in the claims. The term "consisting essentially of" as may be used in the following claims is a partially closed transitional phrase and is intended to include the recited elements plus any unspecified elements that do not materially affect the basic and novel characteristics of the claims. For example, the cable tie may be embossed or printed with indicia and still be included in the meaning of "consisting essentially of", even if not specifically recited. The term "consisting of" as may be used in the following claims is intended to indicate that the claims are restricted to the recited elements.

It should be noted that it is envisioned that any feature, element or limitation that is positively identified in this document may also be specifically excluded as a feature, element or limitation of an embodiment of the present invention.

What is claimed is:

1. A method for forming a fiber-reinforced cable tie comprising:
  placing at least one reinforcing fiber in a mold cavity, wherein said mold cavity includes a fiber guide movably supported therein and said at least one reinforcing fiber extends through said fiber guide;

clamping said at least one reinforcing fiber outside said mold cavity to keep said at least one reinforcing fiber taut;

injecting a molten material in said mold cavity, said molten material defining a moving melt front during said injection; and maintaining a position of said taut at least one reinforcing fiber within said mold cavity at said moving melt front during said injecting by slidingly advancing the moveable fiber guide along said mold cavity by said moving melt front during said injecting, whereby said at least one reinforcing fiber is substantially encapsulated by said molten material.

2. The method as defined in claim 1, wherein said fiber guide slides along a length of said at least one reinforcing fiber while being pushed by said moving melt front in said mold cavity to maintain said position of said at least one reinforcing fiber within said mold cavity.

3. The method as defined in claim 1, wherein said placing said at least one reinforcing fiber in said mold cavity comprises positioning said at least one reinforcing fiber within a central aperture of said fiber guide.

4. The method as defined in claim 1, further comprising placing said at least one reinforcing fiber through a slot of said fiber guide and into a central aperture of said fiber guide before injecting the molten material.

5. The method as defined in claim 1, wherein said fiber guide has a cross-sectional shape substantially matching a cross-sectional shape of the mold cavity.

6. A method for forming a fiber-reinforced cable tie comprising:

placing at least one reinforcing fiber in a mold cavity;

injecting a molten material in said mold cavity, said molten material defining a moving melt front during said injection; and maintaining a position of said at least one reinforcing fiber within said mold cavity at said moving melt front during said injecting, whereby said at least one reinforcing fiber is substantially encapsulated by said molten material by slidingly advancing a moveable fiber guide along said mold cavity by said moving melt front during said injecting, wherein said at least one reinforcing fiber is maintained in said position by the fiber guide, and wherein said fiber guide alternately grips and releases the at least one reinforcing fiber at said melt front during said injecting of said molten material in said mold cavity.

7. The method as defined in claim 6, wherein said fiber guide comprises a plurality of pairs of opposed sliders movably supported in said mold cavity for said alternately gripping and releasing of the at least one reinforcing fiber placed in said mold cavity.

8. The method as defined in claim 7, wherein said pairs of opposed sliders are driven by an actuating mechanism for individually driving each pair of sliders.

9. The method as defined in claim 7, wherein each pair of opposed sliders comprises a pair of inclined actuating surfaces facing each other.

10. The method as defined in claim 9, wherein each slider of each pair of opposed sliders are biased toward one another by a biasing device.

11. A method for forming a fiber-reinforced cable tie comprising:

placing at least one reinforcing fiber in a mold cavity;

injecting a molten material in said mold cavity, said molten material defining a moving melt front during said injection; and maintaining a position of said at least one reinforcing fiber within said mold cavity at said moving melt front during said injecting by slidingly advancing a moveable fiber guide along said mold cavity by said moving melt front during said injecting, whereby said at least one reinforcing fiber is substantially encapsulated by said molten material, wherein said mold cavity includes the fiber guide therein and said at least one reinforcing fiber extends through said fiber guide, and wherein said fiber guide includes a plurality of pairs of opposed sliders movably supported in said mold cavity that alternately grip and release said at least one reinforcing fiber placed in said mold cavity.

12. The method as defined in claim 11, wherein each pair of opposed sliders comprises a pair of inclined actuating surfaces facing each other.

13. The method as defined in claim 12, further comprising biasing the opposed sliders in each pair toward one another.

\* \* \* \* \*